Figure 1:
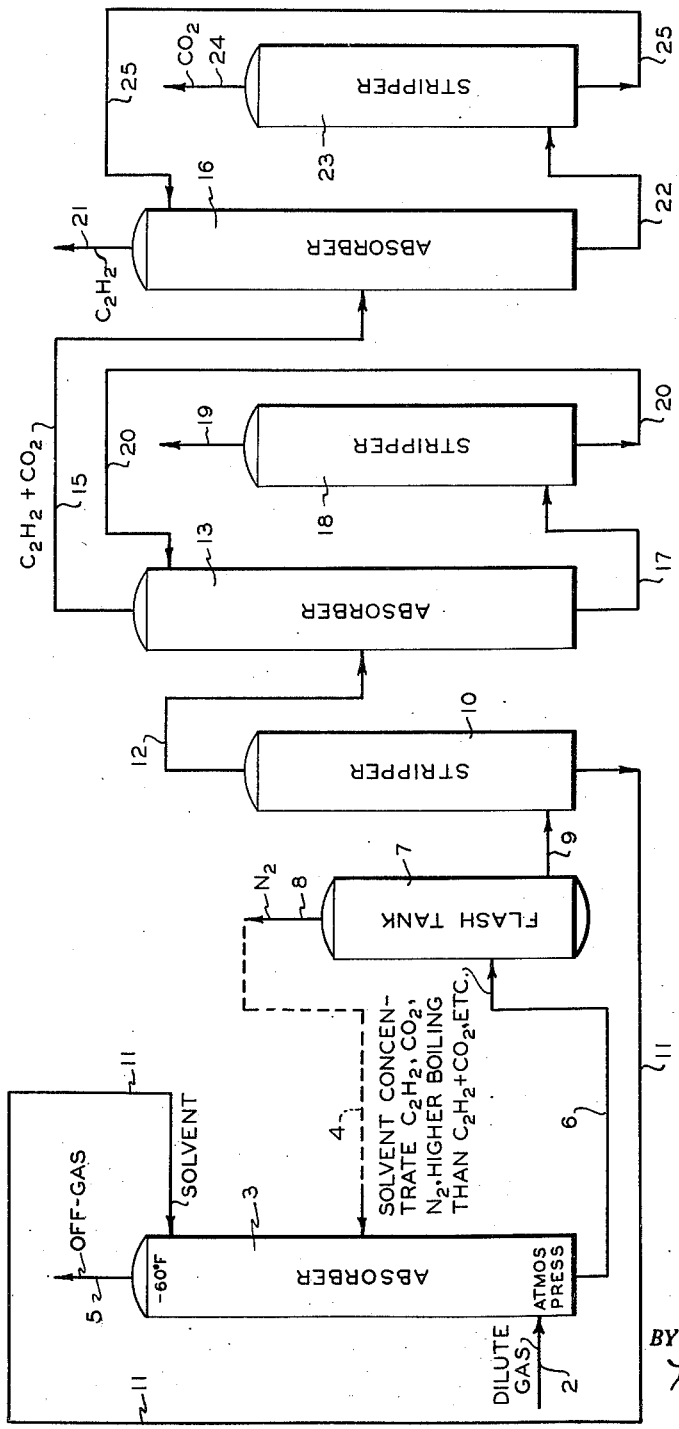

INVENTOR.
R. A. KOBLE
BY Hudson & Young
ATTORNEYS

INVENTOR.
R. A. KOBLE

INVENTOR.
R. A. KOBLE

2,814,359

RECOVERY OF ACETYLENE FROM GASES CONTAINING IT IN SMALL PROPORTION

Robert A. Koble, Bartlesville, Okla., assignor to Phillips Petroleum Company, a corporation of Delaware Application January 25, 1955, Serial No. 483,872

11 Claims. (Cl. 183—115)

This invention relates to the recovery of acetylene from gases. In one of its aspects the invention relates to the recovery of acetylene present in small quantities in a gas stream by first concentrating in a solvent the acetylene and higher boiling constituents of said gas stream and then removing from a gas stream obtained from said solvent the said higher boiling constituents, thus reducing considerably the use of equipment and energy requirements to obtain acetylene from said gas stream containing acetylene in small quantities. In another aspect of the invention it relates to the use of dimethyl formamide to absorb, at very low temperature, of the order of —60° F., acetylene and components boiling close to and higher than acetylene from a gas stream containing same in small quantities, thus separating said acetylene and said components from the major portion of said gas stream, then freeing said absorbed acetylene and said components from said dimethyl formamide, then removing the said components boiling higher than acetylene from said acetylene which is recovered together with any carbon dioxide present in the original gas stream and then separating carbon dioxide from said acetylene, say by a conventional absorption operation. In still another embodiment of the invention a feed gas containing a small proportion of acetylene is contacted at a relatively low temperature with a selective solvent or absorbent to remove substantially all of the acetylene and higher boiling constituents from said gas into said absorbent, the absorbent is then placed under conditions to release therefrom substantially all of any non-hydrocarbon components (e. g. carbon dioxide and nitrogen) which may have been absorbed from said gas, acetylene and other remaining portions of the gas in the absorbent are then released from said absorbent preferably under conditions adapted to prepare said absorbent for reuse in contacting additional quantities of feed gas, and the acetylene is recovered as a product of the process. In a more detailed embodiment acetylene is separated from heavier acetylenes by dissolving the latter in a non-selective solvent such as heptane.

The handling of large quantities of gases to obtain therefrom a highly desirable gas or constituent present therein in small quantities has been a challenge to the economy-minded engineer. Various modus operandi have been suggested. However, it has remained a problem in the art to conceive of a specific modus operandi which will more cheaply and effectively recover acetylene from a gas stream, in which it is contained only in a minor proportion. The present invention has as one of its aspects the provision of a method to reduce the number of steps or operations in which the entire, or even substantial portions of the original gas stream containing the acetylene, must be handled. Other objects, aspects, and the advantages of the invention are apparent from a study of this disclosure, the drawings and the appended claims.

According to an embodiment of the present invention, there has been provided an advantageous novel sequence of steps for the recovery of acetylene from a gas stream, especially one low in acetylene content, which comprises contacting said stream with an absorbent or solvent in a first zone to obtain an enriched absorbent or an enriched solvent containing acetylene and other gases unavoidably absorbed or dissolved together with said acetylene and a residue or off-gas, flashing the enriched solvent so as to remove non-hydrocarbon components (e. g. carbon dioxide and nitrogen) therefrom; in one embodiment of the invention returning the flashed non-hydrocarbon components to the first zone, from which production quantities will be taken off with residue gas there produced; then removing acetylene, any higher boiling acetylenes which may be present, as well as other gases, from said absorbent or from said solvent; contacting said removed gases with an absorbent or with a solvent to absorb or dissolve components of said removed gases which are higher boiling than acetylene and any carbon dioxide therein; removing said higher boiling components from the absorbent or solvent, and then from the system, and finally removing carbon dioxide from said acetylene or acetylenes by any desired means such as a conventional ethanolamine system.

As a preferred solvent for the modus operandi or sequence of steps of the invention dimethyl formamide is selected because of the excellent properties which it has been discovered to possess at very low temperatures of the order of below 0° F. or lower, say, —5° F. to —60° F. and lower. The removal of an acetylene from a mixture of gases containing the same which comprises contacting said gases with dimethyl formamide at a temperature below 0° F. is described and claimed in copending application for patent Serial No. 441,809, filed July 7, 1954, by Raymond C. Scofield.

The present invention, as noted, possesses especially economic advantages over priorly suggested methods when it is applied to a feed gas of relatively low acetylene content. A prior process, in which dimethyl formamide is employed as a solvent, first removes only diacetylene from the feed gas, rather than as in the present invention absorbing all of the soluble constituents of the feed in the said selective solvent. No art is known to this applicant in which his advantageous sequence of steps is employed; and as it can be determined by one skilled in this art, upon a study of this disclosure, the absorption of all gases required unavoidably to be absorbed, under the conditions of the operation, as with say, dimethyl formamide, then removing nitrogen, then removing acetylene and higher boiling gases from the solvent, then removing from said last removed gases components higher boiling than acetylene and finally $CO_2$ from the acetylene and $CO_2$ which remain in the gas stream thus being treated, possesses a simplicity of ease and economy of operation which are highly desirable. Thus, among the manifold advantages is a significant reduction in size of equipment and operating costs, especially when treating dilute feed streams, for example, resulting from the production of carbon blacks by the so-called furnace methods.

Figure 2:
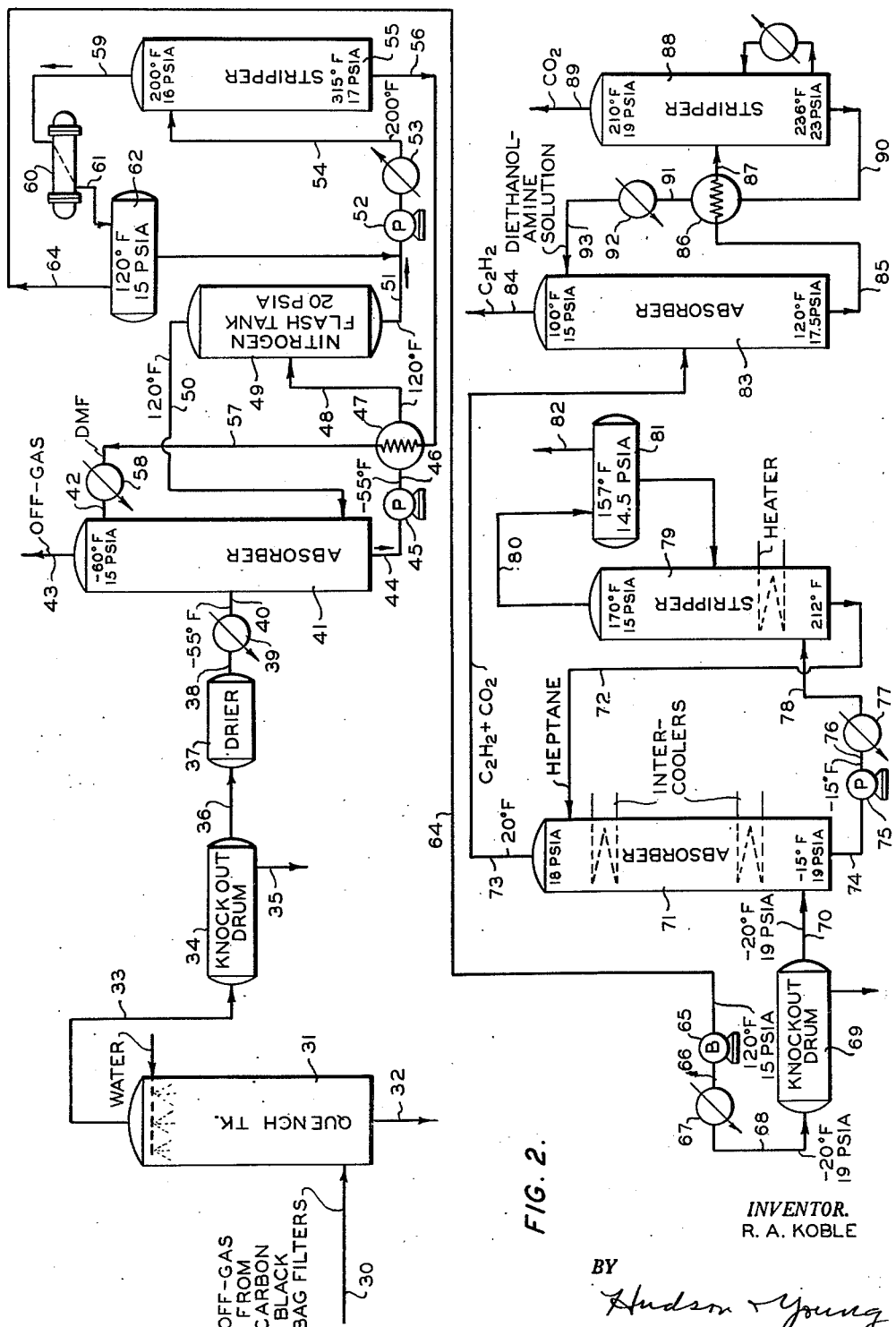
Figure 3:
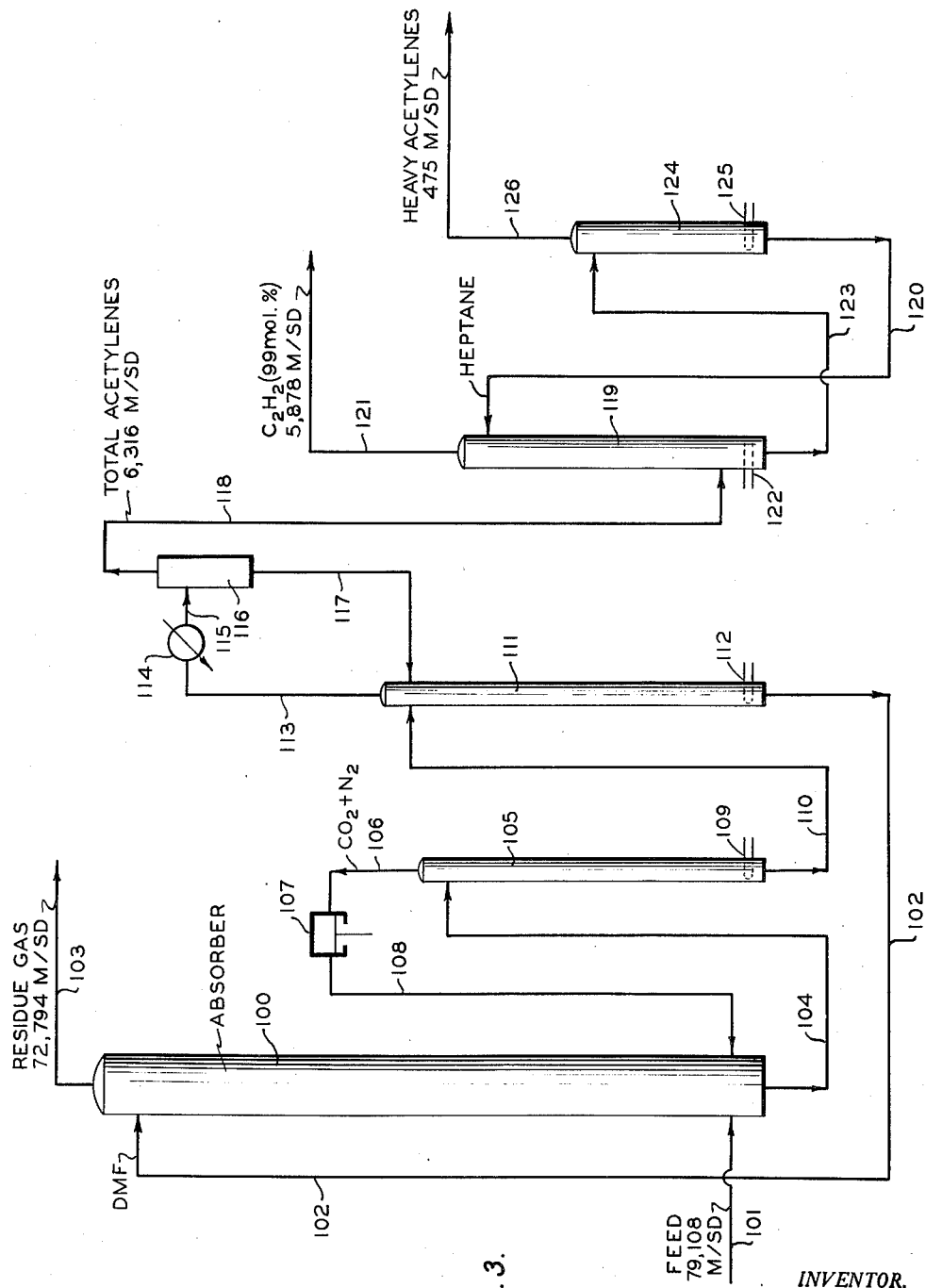
Figure 4:
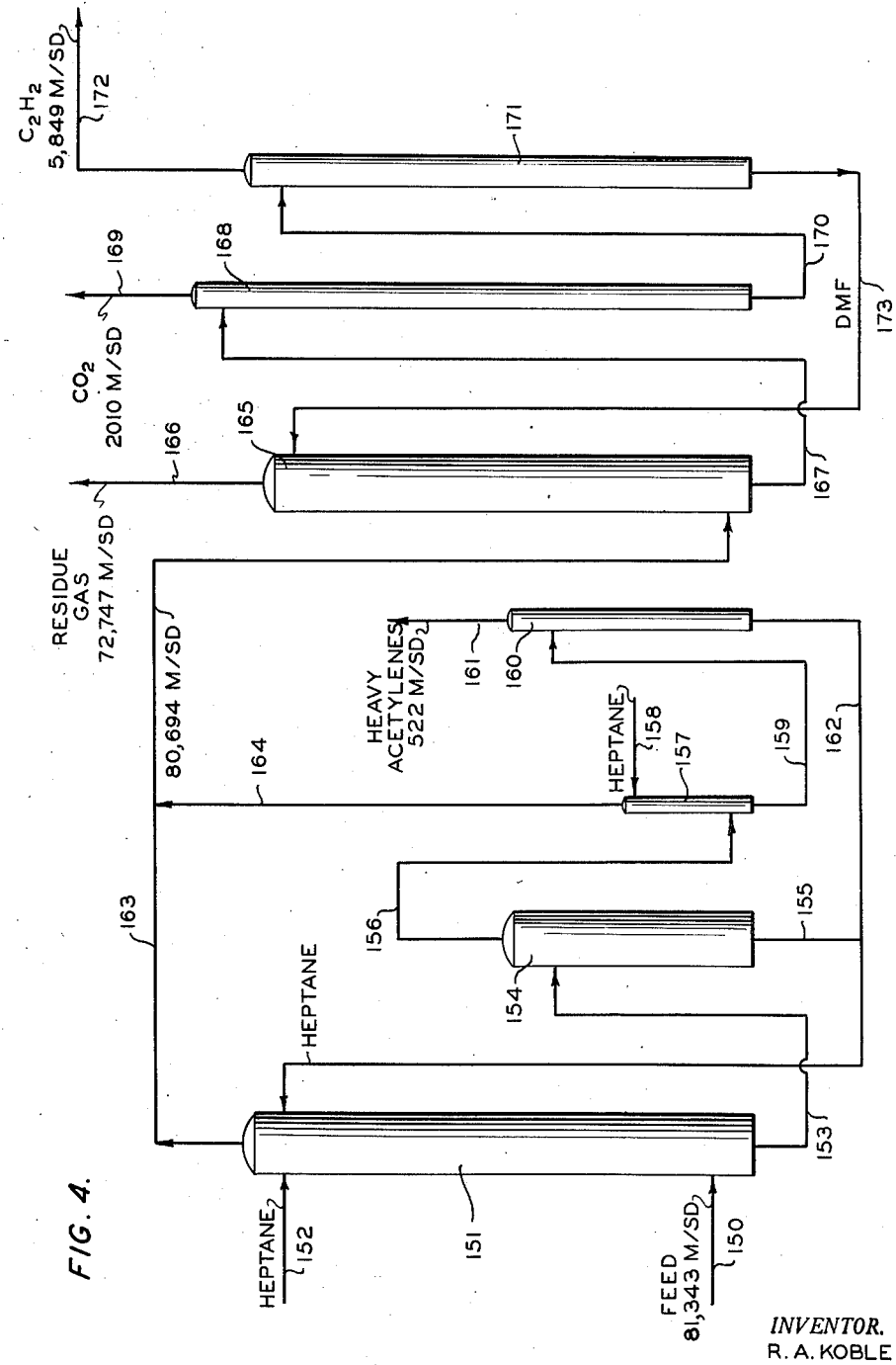

In the drawing, Figure 1 is a broad schematic showing of the sequence of steps of the invention. Figure 2 is a diagrammatic illustration of a specific embodiment of the invention. Figure 3 is a modification of the invention in which substantially all of nitrogen and carbon dioxide are eliminated from the absorbent in the stripper which follows immediately the initial contacting of the feed gas with the absorbent, thus eliminating the acetylene and carbon dioxide separation steps at the end of the system. Also, the pieces of equipment are less in number in Figure 3. Figure 4 is an illustration of a conventional operation in which it will be noted the residue gas is eliminated only after passing through two large absorbers which are required.

Referring now to Figure 1, a dried precooled feed gas which contains highly diluted quantities of acetylene enters the system by way of conduit 2 and is contacted in absorber 3 with dimethyl formamide fed thereto by way of conduit 11. The temperature prevailing in the absorber will be in the neighborhood of −60° F. and the pressure will be substantially atmospheric. The overhead or off-gas is removed from the absorber by way of conduit 5, while the enriched solvent containing acetylene, heavier acetylenes, carbon dioxide, nitrogen, etc., is passed by way of conduit 6 into flasher 7 wherein nitrogen is flashed from the enriched absorbent. Flashed nitrogen is removed overhead from flasher 7 by way of conduit 8 and is returned by way of conduit 4 to a suitable locus in absorber 3. The nitrogen freed enriched absorbent or solvent is then passed by way of conduit 9 into stripper 10 wherein substantially all of the dissolved or absorbed gases are stripped therefrom. The stripped solvent is recycled by way of conduit 11 to absorber 3. The gases are taken overhead from stripper 10 by way of conduit 12 and passed into contact with a solvent such as normal heptane in absorber 13 to which the solvent is fed by way of conduit 20. In absorber 13 components higher boiling than acetylene and carbon dioxide are absorbed while acetylene and carbon dioxide pass overhead by way of conduit 15 into absorber 16. Enriched solvent is passed by way of conduit 17 from absorber 13 into stripper 18. In stripper 18 the solvent is freed of absorbed components which are rejected from the system by way of conduit 19. Stripped solvent is returned to absorber 13 by way of conduit 20. In absorber 16 the acetylene and carbon dioxide gas mixture is contacted with diethanolamine solution to remove carbon dioxide from the acetylene which is recovered as a product by way of conduit 21. Enriched diethanolamine solution passes by way of conduit 22 to stripper 23 from which carbon dioxide is removed overhead by way of conduit 24 and from which stripped absorbent is removed by way of conduit 25 and returned to absorber 16.

It will be noted, as a feature of the invention, that there are produced four gas streams, namely, the off-gas by way of conduit 5, the higher boiling components which are stripped from the normal heptane and removed from the system by way of conduit 19, the acetylene product which is desired which is recovered at conduit 21, and finally, the carbon dioxide product which is recovered by way of conduit 24. Furthermore, it will be noted that equipment size is minimized in view of the large quantity of off-gas which is immediately removed in the first step of the method, namely, in absorber 3.

Referring now to Figure 2, there is passed by way of conduit 30 to quench tower 31 an off-gas from the manufacture of carbon black. Such a gas will contain in various proportions the following gases: hydrogen, carbon monoxide, nitrogen, argon, methane, carbon dioxide, acetylene, ethylene, ethane, methyl acetylene, diacetylene, vinyl acetylene, benzene, hydrogen sulfide, carbonyl sulfide, carbon disulfide, and water. The acetylene content of such a gas is extremely small and in one operation approximately 3,500 mols per stream day of acetylene is diluted in a total of approximately 1,200,000 mols per stream day of said gases.

In tower 31 the gases are directly contacted with cooling water and are sufficiently cooled to bring them down to below about 100° F., for example, down to 85 to 90° F. In lieu of a single quench tower, several quench towers can be employed. Water from the bottom of the quench tower is circulated to a cooling tower, not shown. In the cooling tower provision can be made to remove whatever sediment collects in the bottom. The water is removed to the cooling tower by way of conduit 32. Quenched gases are passed by way of conduit 33 to knock-out drum 34 from which material knocked out is withdrawn by way of conduit 35 to sewer. The gases then pass by way of conduit 36 to drier 37, and, after passing to conduit 38, cooler 39 and conduit 40, enter absorber 41. Absorber 41 is fed with dimethyl formamide by way of conduit 42. The temperature in absorber 41, in the operation which is being described, is −60° F., and the pressure is approximately atmospheric pressure. In absorber 41 substantially all of the gases such as acetylene, carbon dioxide and higher boiling materials are absorbed in the dimethyl formamide, the unabsorbed gases or off gas being withdrawn from the system as an overhead by way of conduit 43. Bottoms from absorber 41 are passed by way of conduit 44, pump 45, conduit 46, heat exchanger 47, and conduit 48 into nitrogen flash drum 49 wherein nitrogen is flashed from the enriched absorbent. Flashed nitrogen is returned to absorber 41 by way of conduit 50. This nitrogen ultimately finds its way into the off-gas. The enriched absorbent now freed of its nitrogen is withdrawn from nitrogen flash drum 49 and passed by way of conduit 51, pump 52, heater 53, and conduit 54 into stripper 55 in which the dimethyl formamide is stripped of all of its solute gases. The dimethyl formamide is withdrawn from the bottom of stripper 55 and passed by way of conduit 56 through heat exchanger 47 and conduit 57 to chiller 58 and conduit 42 back to absorber 41. Overhead from stripper 55 passes by way of conduit 59 and cooler 60 and conduit 61 into accumulator 62. Any entrained dimethyl formamide is passed by way of conduit 63 to the suction side of pump 52. Overhead from the accumulator passes by way of conduit 64, blower 65, conduit 66, and a cooler or coolers 67 and conduit 68 to knock-out drum 69. From the knock-out drum, or drums as the case may be, the gases which have been recovered from the dimethyl formamide in stripper 55 by way of accumulator 62 are passed by way of conduit 70 into absorber 71. In this absorber the gases are contacted with heptane. Briefly, the purpose of the heptane is to, as it were, deoil the gases. Thus, the gases passing upwardly through absorber 71 are contacted with heptane introduced by way of conduit 72 into absorber 71. Overhead from the absorber, removed by way of conduit 73, consists substantially of acetylene and carbon dioxide. Bottoms from absorber 71 are passed by way of conduit 74, pump 75, and conduit 76, through heater 77, and conduit 78 into stripper 79 wherein heptane is freed of its solute constituents. Heptane is recovered by way of conduit 72 and passed by way of said conduit into absorber 71. Overhead from stripper 79 is passed by way of conduit 80 into accumulator 81. Bottoms from accumulator 81 are returned to stripper 79 and overhead from accumulator 81 can be passed to fuel gas storage by way of conduit 82. The acetylene and carbon dioxide stream in conduit 73 is passed to absorber 83. In absorber 83 the gas stream is contacted with a diethanolamine solution thus separating carbon dioxide from the acetylene which is removed by way of conduit 84. The enriched diethanolamine solution is removed as bottoms from absorber 83 by way of conduit 85 and passed by way of heat exchanger 86 and conduit 87 into stripper 88. In stripper 88 diethanolamine solution is freed of carbon dioxide which is removed as overhead by way of conduit 89. The stripped diethanolamine solution is then passed by way of conduit 90, heat exchanger 86, conduit 91, cooler 92, and conduit 93 into absorber 83.

Referring now to Figure 3, a gaseous feed stream is treated according to the invention as follows: The gas stream is introduced into absorber 100 by way of conduit 101 wherein it is contacted at a low temperature with dimethyl formamide fed to the tower by way of conduit 102, resulting in a residue gas which is taken overhead by way of conduit 103 to utilization as fuel or for other purposes, enriched solvent is removed by way of conduit 104 and passed to flash tank 105 wherein conditions are maintained to cause flashing of substantially all of the carbon dioxide and nitrogen which are contained in the enriched solvent. The last-mentioned gases are taken overhead by way of conduit 106 and pumped by way of compressor 107 and conduit 108 into absorber 100. Flash tank 105 is equipped with temperature regulating coil 109. With use of coil 109, the temperature of stripper 105 is regulated to obtain the desired removal of carbon dioxide and nitrogen. It will be obvious to those skilled in the art, in possession of this disclosure, that a small portion of acetylene might be removed together with the carbon dioxide and nitrogen. However, as long as this portion is kept small, it will be reabsorbed in absorber 100. This arrangement according to the invention, namely, the treatment of an enriched solvent first obtained to flash therefrom substantially all the carbon dioxide and nitrogen, together with a small amount of acetylene, which acetylene is not lost from the process, is particularly advantageous according to the invention. Thus, at an early stage, carbon dioxide is removed from the processing apparatus. The flashed enriched solvent is passed by way of conduit 110 into stripper 111. A coil 112 is provided to regulate the temperature in the bottom of the stripper from which there is removed solvent substantially denuded of all of the absorbed gases. The solvent is then returned by way of conduit 102, upon suitable heat exchange and refrigeration which are not shown, to absorber 100. The overhead from stripper 111 contains acetylene and heavy acetylenes which are passed by way of conduit 113, cooler 114, and conduit 115 into reflux drum 116. Liquid from the bottom of drum 116 is returned by way of conduit 117 as reflux for the top of the stripper. Overhead from drum 117 comprising the acetylenes is passed by way of conduit 118 into absorber 119. Absorber 119 is fed heptane by way of conduit 120. The heptane absorbs heavy acetylenes but allows acetylene to pass out as overhead by way of conduit 121. Coil 122 permits regulation of the temperature of the bottoms taken from absorber 119. The enriched bottoms which contains the heavy acetylenes dissolved in the heptanes is passed by way of conduit 123 into stripper 124. Stripper 124 is provided with heating coil 125 and is heated so that heavy acetylenes pass overhead by way of conduit 126. Heptane substantially denuded of heavy acetylenes is returned to absorber 119 by way of conduit 127.

For purposes of comparison of the modus operandi which are the subject matter of the present invention, with prior art procedure, reference is now made to Figure 4 in which a feed gas as treated in the several modus operandi according to the invention, is passed by way of conduit 150 into absorber 151 which is fed by way of conduit 152 with normal heptane. Absorber 151 is operated under conditions to produce as overhead a gas stream containing all the gases of which the gas stream is comprised except the small proportion of oils including heavy acetylenes which are contained in the feed. Bottoms from absorber 151 are passed by way of conduit 153 into tank 154 wherein heavy acetylenes, as well as some acetylene, are separated from the enriched n-heptane. The n-heptane is returned to absorber 151 by way of conduit 155. The overhead from tank 154 is passed by way of conduit 156 into a n-heptane absorber 157 to which n-heptane is fed by way of conduit 158. In absorber 157, the n-heptane dissolves substantially all of the oils including heavy acetylenes which are passed dissolved in said n-heptane by way of conduit 159 into stripper 160. In stripper 160, heavy acetylenes and other heavy materials are stripped from the n-heptane and are removed overhead by way of conduit 161. n-Heptane is returned to absorber 151 by way of conduit 162. In the arrangement just described, heat exchangers, coolers, etc. have been omitted as in connection with the description of the other drawings to provide for clarity. The two gas streams which are the overheads from absorber 151 taken therefrom by way of conduit 163 and the overhead from absorber 157 taken overhead therefrom by way of conduit 164 are fed by way of conduit 163 into absorber 165. In absorber 165, the gas stream, which has now been "deoiled," is contacted with dimethyl formamide to produce overhead, by way of conduit 166, a residue gas and as bottoms, by way of conduit 167, enriched solvent which is passed to $CO_2$ stripper 168 in which $CO_2$ is stripped from the solvent and taken overhead by way of conduit 169. Bottoms from stripper 168 are passed by way of conduit 170 into acetylene stripper 171 from which is taken overhead by way of conduit 172 the acetylene product. Dimethyl formamide, substantially denuded of acetylene, is returned by way of conduit 173 to absorber 165 for reuse.

It will be observed upon scrutiny of Figures 3 and 4 that sizes of equipment component parts required, generally, to effect the steps of the two modus operandi represented by the said figures, have been placed upon the drawings. It will also be noted that the various quantities of the various streams have been given for purposes of comparison. It has been found that the advantage of the operation according to Figure 3 over the operation according to Figure 4 is quite marked. Indeed, among the specific advantages which are observed are the following: The heat exchange surface required in the heavy acetylenes removal system of Figure 4 is 27,425 square feet while in Figure 3, it is only 3,538 square feet. The heptane circulation in Figure 4 is 900 gallons per minute while it is only 85 gallons per minute in Figure 3. Similarly, refrigeration required for the heptane is approximately 7,000,000 B. t. u. per hour in Figure 4 while it is only about 1,000,000 B. t. u. per hour for Figure 3. Still further, the methylacetylene content of the acetylene product produced is about 0.5 mol percent for the operation of Figure 4 whereas it is only about 0.2 mol percent in Figure 3. These and other advantages which will become apparent to one skilled in the art studying this disclosure show that the modus operandi according to this invention, in which acetylene and other soluble components are absorbed at low temperature in a solvent such as dimethyl formamide, following a release of at least a portion of the non-hydrocarbon components in a flashing operation, and then followed by a release of all of the acetylenes from the dimethyl formamide with an ensuing separation of the acetylene from heavier acetylenes by dissolving the latter in a non-selective solvent such as heptane (a solvent which separates on the basis of molecular weights) is markedly different from any heretofore known in the prior art and have resulted in considerable economies. Thus, it should be noted that in Figure 4 all of the gas stream, that is, the entire gas stream, is passed through absorber 151 for deoiling. This requires a very large absorber. Since the volume of heavy acetylenes is relatively small, the overhead stream from the heptane absorbers 151 and 157 is large in volume and consequently, both absorbers and indeed, the dimethyl formamide absorber 165, have to be large since substantially the entire volume of said gas passes through absorbers 151 and 165 and in part through absorber 157. While in Figure 3 the entire feed passes through absorber 100, it will be noted that of the 79,108 mols per stream day entering the said absorber, there are removed from the system as overhead from the said absorber 72,794 mols per stream day, leaving only 6,316 mols per stream day, after separation of carbon dioxide and nitrogen, to pass to the heavy acetylene separation system. In Figure 4, the original feed is 81,343 mols per stream day and of this, because heavy acetylenes are first removed, there remains 80,694 mols per stream day to pass into absorber 165, which of course, must accommodate this volume of gas.

It will be understood by one skilled in the art in possession of this disclosure that in the figures of the drawing there have been omitted for sake of brevity and simplicity the manifold heat exchangers, pumps, and other equipment components, for example reflux or other accumulators, separators, coolers, etc., and that illustration of such details is not necessary to an understanding of the sequence of steps of the modus operandi of the invention.

One skilled in the art will be able to design into the sequence a desired series of heat exchangers and other equipment to take full advantage of heat as well as cooling capacity available. As a specific example, it is possible following the blower to use a plurality of coolers and knock-out drums, and there may be coolers preceding and following each, or at least one or more, of said drums.

While preferred operating conditions have been indicated in the specification and drawings, for the various process steps, it will be understood that these conditions can be varied within rather wide limits in each case. Thus, in the embodiment of Figure 2 the feed and the solvent each can be introduced into absorber 41 at a temperature of from −30° to −70° F. and the pressure in this absorber can be atmospheric or somewhat higher. Flash drum 49 can be operated at a temperature between 110° and 140° F. Stripper 55 can be at a top temperature of from 180° to 220° F. and a bottom temperature between 310° and 330° F. In absorber 71 the pressure can be from 18 to 22 p. s. i. a. and the temperature from −30° to +40° F. Stripper 79 can be operated at a top temperature of from 150° to 180° F., a bottom temperature of 210° to 220° F. and a pressure somewhat above atmospheric. In absorber 83, which is operated at substantially atmospheric pressure, the feed can be at a temperature of from 70° to 100° F. and the solvent at 90° to 100° F. Stripper 88 can be operated at a pressure of from 17 to 23 p. s. i. a. and a temperature of 225° to 245° F.

In the embodiment of Figure 3 the following conditions of temperature and pressure can be employed: Absorber 100, feed +10° to −20° F., solvent 0° to −30° F., pressure 25 to 40 p. s. i. a.; stripper 105, 30° to 110° F. at top, 110 to 140° F. at bottom, 20 to 40 p. s. i. a.; stripper 111, 170° to 190° at top, 310° to 330° F. at bottom, 18 to 22 p. s. i. a.; absorber 119, feed −30° to +50° F., bottom temperature 145° to 165° F., pressure 15 to 17 p. s. i. a.; stripper 124, 160° to 180° F. overhead, 180° to 200° F. at bottom, 18 to 22 p. s. i. a.

In place of dimethyl formamide, other relatively non-volatile selective solvents for acetylene may be used. Among these may be mentioned other dialkyl amides such as dimethyl acetamide, as well as butyrolactone and N-methyl 2-pyrrolidone. In place of n-heptane, other non-selective solvents capable of separating hydrocarbon gases on a molecular weight basis can be used. These include paraffinic, naphthenic and aromatic hydrocarbons having from 6 to 10 carbon atoms per molecule, such as n-hexane, n-nonane, isooctane, benzene, toluene, xylene, cyclohexane, methylcyclohexane and the like.

Reasonable variation and modification are possible within the scope of the foregoing disclosure, drawings, and the appended claims to the invention, the essence of which is that there have been provided certain novel and highly beneficial modus operandi for the recovery of acetylene from a gas stream containing the same, especially in rather small proportions, which comprises, first separating from the said gas stream acetylene and all components of said gas stream boiling higher than acetylene, including any non-hydrocarbon components unavoidably absorbed with said acetylene and said higher boiling components, and then separating from the said components the said materials boiling higher than said acetylene, as described; in a specific embodiment removing from the separated acetylene and said other components, substantially all of any non-hydrocarbon components and then separating acetylene from the remaining components, as described; and in another specific embodiment flashing off only a portion of said non-hydrocarbon components (e. g. nitrogen), then separating from the then remaining components acetylene and unavoidably separated non-hydrocarbon components (e. g. carbon dioxide) and then separating acetylene from said carbon dioxide, also as described and set forth above.

I claim:
1. A method for the recovery of acetylene from a first gas stream containing same in admixture with ethylene, heavier acetylenes, carbon dioxide, and nitrogen which comprises contacting said stream with an absorbent to obtain an enriched absorbent from a first zone, containing substantially all of said acetylene and substantially all of said heavier acetylenes and other gases unavoidably absorbed together with said acetylene including nitrogen and carbon dioxide, and to obtain a residue gas containing substantially all of said ethylene and other hydrocarbons lower boiling than acetylene; flashing the enriched absorbent so as to remove at least a portion of the nitrogen therefrom without removing any substantial quantity of acetylene therefrom, returning the stream containing the flashed nitrogen to said zone; then removing substantially all of said absorbed gases including acetylene, higher boiling acetylenes, and carbon dioxide from said absorbent to form a second stream containing said gases, contacting said second stream with an absorbent to absorb components of said removed gases therein, which components are higher boiling than acetylene and carbon dioxide, removing said higher boiling components from the absorbent and then from the system, and finally removing carbon dioxide from said acetylene.

2. A method for the recovery of acetylene from a gas stream containing the same in minor quantities in admixture with ethylene, heavier acetylenes, carbon dioxide, and nitrogen, and other hydrocarbon gases which comprises contacting said stream with a solvent to obtain an enriched solvent containing acetylene and heavier acetylenes, nitrogen, carbon dioxide, and other gases unavoidably absorbed or dissolved together with said acetylene in said solvent, leaving a residue gas containing substantially all of said ethylene and other hydrocarbon components lower boiling than acetylene, flashing the enriched solvent so as to remove at least a portion of the nitrogen therefrom without removing any substantial quantity of acetylene therefrom, then removing all of the gases remaining in said solvent therefrom to form a gas stream containing all of said removed gases, then treating the gas stream thus obtained by contacting the same with a solvent so as to absorb components of said removed gases other than acetylene and carbon dioxide, and then separating said carbon dioxide from said acetylene.

3. A method according to claim 2 which comprises in the first contacting of said stream with a solvent employing dimethyl formamide at a temperature below 0° F. and in said second contacting to remove gases other than acetylene and carbon dioxide, using a low boiling hydrocarbon as the solvent.

4. A method according to claim 3 wherein said low boiling hydrocarbon solvent is heptane.

5. A method according to claim 4 wherein the gas containing the acetylene is a gas resulting from the production of furnace carbon black.

6. The recovery of acetylene, carbon dioxide and nitrogen, as well as components boiling higher than acetylene, from a gas containing the same and also containing ethylene and heavier acetylenes which comprises contacting the said gas in an absorber with dimethyl formamide at a temperature of approximately −60° F., and under a pressure of approximately 15 pounds per square inch absolute so as to form an off-gas containing substantially all of said ethylene and an enriched dimethyl formamide containing acetylene and substantially all of said heavier acetylenes, and other components unavoidably absorbed including carbon dioxide and nitrogen; subjecting the enriched dimethyl formamide to conditions of temperature and pressure so as to flash at least a portion of the nitrogen therefrom without removing any substantial quantity of acetylene therefrom, resulting in a flashed enriched dimethyl formamide; subjecting said flashed enriched dimethyl formamide to conditions resulting in the stripping therefrom of all of its solute gases to form a stream containing all of said stripped gases, and returning said dimethyl formamide for reuse as described; then passing at least a portion of said solute gases, which have been freed from said dimethyl formamide, into an absorber and therein contacting said gases with heptane under conditions to remove from said gases components boiling higher than acetylene, which are recovered from said heptane; removing from said absorber a gas stream rich in acetylene and containing some non-hydrocarbon components including carbon dioxide and then contacting said acetylene-containing stream with a solvent adapted to remove therefrom the said non-hydrocarbon component; and finally recovering substantially pure acetylene and carbon dioxide from the process.

7. A method for the recovery of acetylene from a first gas stream containing the same in minor quantities and also containing heavier acetylenes, carbon dioxide, and nitrogen which comprises contacting said stream with a solvent and absorbing only a minor portion of said first gas stream to obtain an enriched solvent containing substantially all of said acetylene and said heavier acetylenes originally contained in said first gas stream and also containing carbon dioxide and nitrogen, and to obtain a residue gas; passing said enriched solvent as the sole feed containing acetylene to a desorption zone and desorbing therein at least a portion of the nitrogen from said enriched solvent to form a second stream containing said desorbed nitrogen, then removing substantially all of the remaining absorbed components from said solvent to form a third gas stream and then treating said third gas stream by contacting the same with a solvent and thereby absorbing in said solvent substantially all of the hydrocarbon components other than acetylene, and thereby forming two streams, namely, a fourth gas stream containing substantially all of the acetylene in said third gas stream and an enriched solvent containing substantially all of the heavier acetylenes in said third gas stream, said fourth stream being a product of the process.

8. Process of claim 7 wherein said solvent contacted with said first stream is dimethyl formamide and said solvent contacted with said third stream is heptane.

9. A method for the recovery of acetylene from a first gas stream containing the same in minor quantities and also containing heavier acetylenes, carbon dioxide, and nitrogen which comprises contacting said stream with a solvent and absorbing a minor portion of said first gas stream to obtain an enriched solvent containing substantially all of said acetylene and said heavier acetylenes originally contained in said first gas stream and also containing carbon dioxide and nitrogen, and to obtain a residue gas; passing said enriched solvent as the sole feed containing acetylene to a desorption zone and desorbing therein substantially all of said nitrogen and said carbon dioxide from said enriched solvent to form a second stream containing said desorbed nitrogen and carbon dioxide, then removing substantially all of the remaining absorbed components from said solvent to form a third gas stream, and then treating said third gas stream by contacting the same with a solvent and thereby absorbing substantially all of the components other than acetylene and thereby forming two streams, namely, a fourth gas stream containing substantially all of the acetylene in said third gas stream and an enriched solvent containing substantially all of the heavier acetylenes in said third gas stream, said fourth gas stream being a high purity acetylene stream and a product of the process.

10. Process of claim 9 wherein said solvent contacted with said first stream is dimethyl formamide and said solvent contacted with said third stream is heptane.

11. A method for the recovery of acetylene from a gas stream containing the same in minor quantities and also containing heavier acetylenes, carbon dioxide and nitrogen which comprises contacting said stream with a solvent to obtain an enriched solvent containing acetylene and other gases unavoidably absorbed together with said acetylene in said solvent including heavier acetylenes, nitrogen and carbon dioxide, desorbing at least a portion of the nitrogen from said enriched solvent, while leaving absorbed at least the major portion of said carbon dioxide and the other components higher boiling than carbon dioxide in said solvent to form a stream containing said desorbed nitrogen, removing all of the remaining absorbed gases from said solvent and treating the gas stream thus obtained by contacting the same with a solvent and thereby absorbing components of said removed gases other than acetylene and carbon dioxide, and then separating said carbon dioxide from said acetylene.

References Cited in the file of this patent
UNITED STATES PATENTS

| | | |
|---|---|---|
| 1,988,032 | Baumann et al. | Jan. 15, 1935 |
| 2,668,748 | Asbury | Feb. 9, 1954 |
| 2,714,940 | Milligan | Aug. 9, 1955 |
| 2,726,734 | Nirenberg | Dec. 13, 1955 |